Patented May 6, 1924.

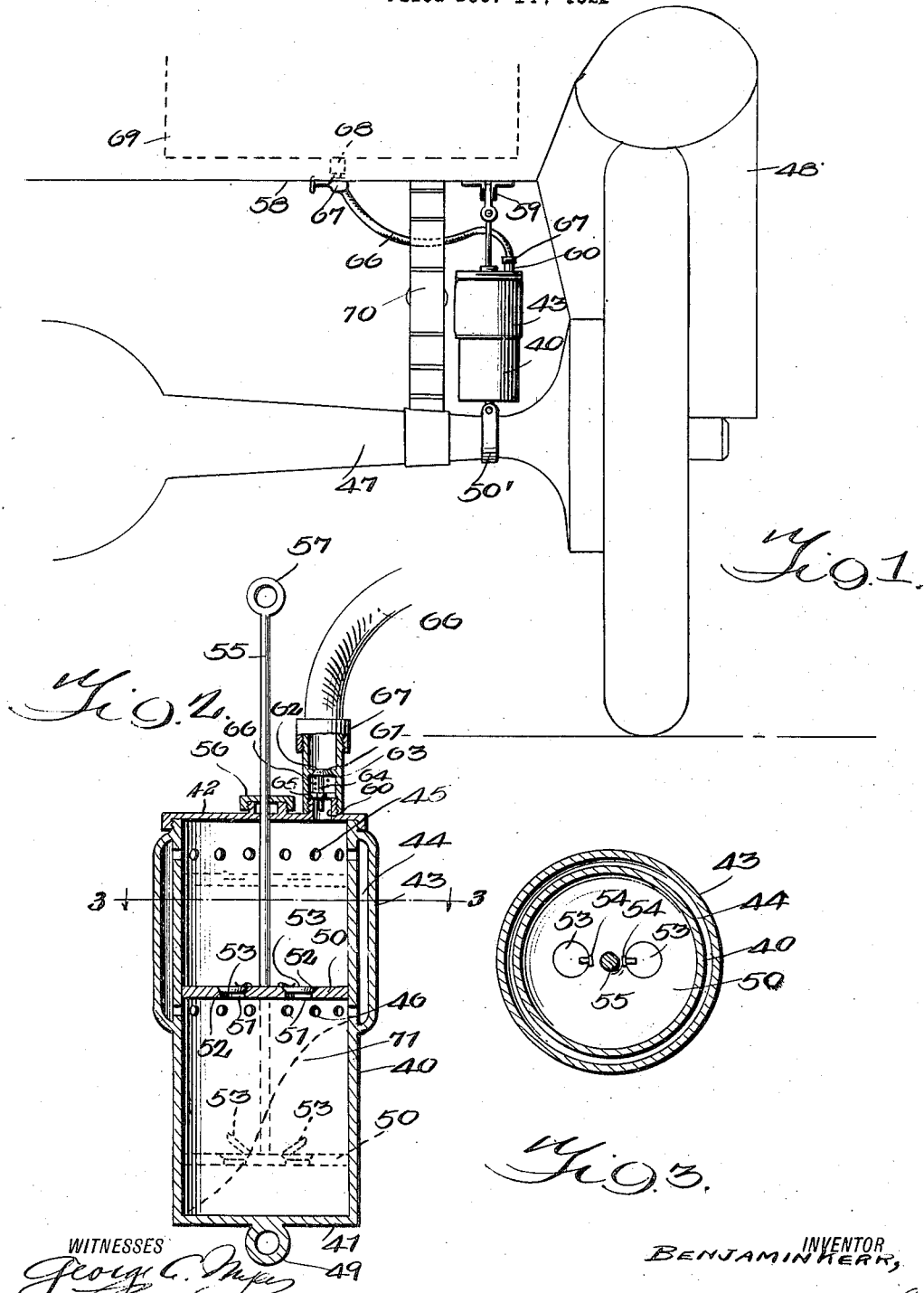

1,492,731

UNITED STATES PATENT OFFICE.

BENJAMIN KERR, OF SARNIA, ONTARIO, CANADA.

SHOCK ABSORBER.

Application filed December 14, 1922. Serial No. 606,892.

*To all whom it may concern:*

Be it known that I, BENJAMIN KERR, a subject of the King of Great Britain, and a resident of Sarnia, in the Province of Ontario, Dominion of Canada, have invented certain new and useful Improvements in Shock Absorbers, of which the following is a specification.

My invention relates to shock absorbers and cushioning devices of the type which is adapted primarily for positioning between two parts which are flexibly spaced apart by springs, as for instance between the frame and axle or axle housing of an automobile or other vehicle, in association with such springs to control the action of the springs in such manner as to preclude jerky or violent movements of the spaced apart parts and to absorb shocks and jars ordinarily caused by subjecting one of such spaced apart parts to varying stresses or loads, as for instance when the vehicle provided with the device passes over a surface having protuberances thereon and ruts or depressions therein.

More specifically, the present invention is an improvement over the shock absorber and cushioning device disclosed in Letters Patent of the United States, No. 1,447,088, granted to me Feby. 7, 1923. An important object of the present invention is to provide a shock absorber and cushioning device of the character described which is constructed in such manner as to provide a cushion of any fluid, such as air, at any suitable pressure, which pressure may be varied according to the load that is to be sustained thereby.

Other objects and advantages will be apparent from the following description and the novel features of the invention will be particularly outlined in the appended claims.

A practical embodiment of the invention is illustrated in the accompanying drawings, forming a part of this application, in which Figure 1 is a fragmentary rear elevation showing my improved shock absorber and cushioning device applied to an automobile, Figure 2 is an enlarged vertical section through the shock absorber and cushioning device covered in Figure 1, and Figure 3 is a transverse or horizontal section through the shock absorber and cushioning device along the line 3—3 of Figure 2 and looking in the direction indicated by the arrows.

As in the shock absorber and cushioning device disclosed in my aforesaid prior application for Letters Patent, the present invention contemplates the provision of a casing 40 which is shown as being cylindrical in cross sectional contour and is permanently closed at its one end by an integral head or end 41 and normally closed at its other end by a cap 42 which is in threaded engagement with the walls thereof. The casing 40 which will be hereinafter referred to as the cylinder is provided with a jacket 43 concentric therewith and merged at its ends into the walls of the cylinder, the said jacket being spaced from the outer wall of the cylinder at all other points to provide an annular chamber 44 surrounding the upper portion of the cylinder 40 and extending from a horizontal plane adjacent to that of the end of the cylinder provided with the cap 42 to a plane extending transversely through the cylinder intermediate of its length. The annular chamber 44 communicates adjacent to its upper end with the interior of the cylinder 40 through a circumferential series of spaced apart ports or apertures 45 formed through the walls of the cylinder adjacent to the upper end of the latter. The annular chamber 44 also communicates adjacent to its lower end with the interior of the cylinder 40 through spaced apart ports or apertures 46 arranged in a circumferential series through the walls of the cylinder.

In service, the cylinder 40 is arranged vertically with the end thereof provided with the cap 42 uppermost and is shown in Figure 1 as being attached at its lower end to the axle housing 47 of an automobile 48 through the agency of an integral eye or loop 49 depending from the central portion of the end or head 41 and being connected for swinging or universal movement to a retaining clamp or ring 50' carried by the axle housing.

A piston or plunger 50 is reciprocable in the cylinder 40 and is provided with a plurality of apertures 51 therethrough, which apertures have the walls thereof bevelled at their upper ends as indicated at 52 to provide seats for flap valves 53 which are hingedly attached to the piston at edges of the apertures 51, as indicated at 54 in Figure 3, whereby the flap valves are normally actuated by gravity to remain in horizontal position and in position to close the apertures 51.

A piston rod or stem 55 is rigidly connected at its lower end to the piston 50 in axial alinement with the latter and extends slidably through a stuffing box 56 formed centrally of the cap 42. The piston stem 55 is provided at its upper end with an eye 57 which is adapted for universal joint or other suitable connection with a bracket or hanger 59 depending from the body or frame 58 of the vehicle. The parts described so far conform substantially in construction to corresponding parts disclosed in the aforesaid Letters Patent, No. 1,447,088. However, the present invention contemplates the provision of means whereby various fluids, such as air, may be supplied continuously to the interior of the cylinder 40 and placed under pressure which may be varied according to the load which is to be sustained by the air cushion created thereby. To this end, the cap 42 is provided with a nipple or pipe connection 60 which is threadedly engaged with a tubular housing 61 in which a seat 62 is provided for a valve 63 which is supported within the housing in any suitable manner to permit the passage of air under atmospheric pressure into the cylinder 40 and to be moved to closed position upon an increase of pressure within the cylinder to prevent the flow of air or other fluid from the cylinder through the housing 61. In the embodiment of the invention illustrated, the valve 63 is provided with a depending axial stem 64 slidable in a vertical bore provided in a guide 65. The latter may be supported upon the upper end of the nipple 60 or may extend from the inner walls of the valve housing. The arrangement is such that the valve 63 is positioned adjacent to but not against its seat when a fluid within the cylinder 40 above the piston 50 is at atmospheric pressure. A spring 66 coiled about the stem 64 between the valve 63 and the guide 65 has strength sufficient to hold the valve 63 adjacent to its seat but not to force the valve against its seat. Obviously, as the pressure within the cylinder increases above atmospheric pressure, the valve 63 which is relatively light in weight will be moved upwardly against its seat and will thus prevent ingress of air at atmospheric pressure and egress of fluid from the cylinder until pressure within the latter has decreased to atmospheric pressure. Any suitable means for controlling the flow of fluid through the inlet 60 may be provided in carrying my invention to effect, the particular means shown in the drawings and just described being illustrative and not restrictive.

In the event that it is desired to compress the cushioning fluid disposed within the cylinder 40 in order that relatively heavy loads and stresses may be sustained thereby, a flexible conduit 66 is connected at its one end by a suitable pipe connection such as indicated at 67 with the outer end of the valve housing 61 and the other end of the flexible conduit is connected with a reducing valve 67 provided in communication with an outlet 68 for a source of pressure fluid supply 69 which may be a tank or reservoir supported upon the body or frame of the vehicle 48. The reducing valve 67 may be of any suitable known type of construction and is adapted to be adjusted to control the degree of compression of the fluid supplied through the conduit 66 to the cylinder. The conduit 66 may be metallic or may be formed of any other suitable material having sufficient inherent strength to sustain the stresses to which subjected when fluids under pressure are forced therethrough.

From the foregoing description of the various parts of the device, the operation thereof may be readily understood. When the fluid within the cylinder 40 is at atmospheric pressure, very little resistance is opposed to the downward movement of the piston 50 within the cylinder 40, the flap valves 53 opening freely to permit passage of the cushioning fluid from the space within the cylinder below the piston to the space above the latter. This arrangement will obtain when the load to be sustained is relatively light. However, as the loads or stresses to be sustained are increased, the pressure on the fluid within the cylinder may be increased through the agency of the source of pressure supply 69, the reducing valve 67 and the conduit 66 in conjunction with the inlet 60, in the manner described, the pressure on the fluid within the cylinder being varied by adjustment of the reducing valve as required to effectively sustain various loads. In each instance, the resistance will be sufficiently great to prevent jerky and violent movements of the body or frame of the vehicle relatively to the axle while the piston is moving downwardly in the cylinder and springs 70 which flexibly space the body or frame from the rear axle are being placed under compression. However, when the springs 70 are permitted to expand and the piston 50 is moved upwardly in the cylinder, as when the axle 47 moves downwardly in respect to the body or the body or frame 58 moves upwardly relatively to the axle, the resistance opposed to the upward movement of the piston within the cylinder from the lower end of the latter will be relatively great irrespective of the degree of compression obtaining within the cylinder at the time of the beginning of the upward stroke of the piston since the valves 53 will remain closed during the upward movement of the piston and the valve 63 will likewise close. During the upward movement of the piston within the cylinder from the lower end thereof to the intermediate portion of the cylinder, the resistance will decrease during the initial part of the stroke, then increase owing to compression and finally decrease as indicated by the velocity curve designated by the dash lines in Figure 2 and indicated at 71. When the piston passes the ports 46 the compressed fluid above the piston will flow through the annular chamber 44 to the space below the piston so that the pressure within the cylinder will be equalized above and below the piston and the resistance opposed to the further upward movement of the piston 50 will be determined by the degree of compression of the cushioning fluid within the cylinder. With the organization described the action of the springs 70 may be effectively controlled so as to prevent a violent recoil after the ground wheels of the vehicle 48 passes over surface having ruts and depressions therein and protuberances thereon, whereby discomfort to the occupants of the vehicle because of jarring and the violent or jerky movements of the body and axle of the vehicle relatively to each other is obviated. The pressure within the cylinder may be varied at will so that the same results may be obtained when various loads are placed upon the springs 70. The position of the piston in respect to the body 58 or like part of a vehicle when in inactive position or not under load may be varied by any suitable known means, none being shown, so that it will be adapted to coact with the fluid cushion within the cylinder and with the flexibly spaced parts of the vehicle to effectively control the action of the spacing springs when the latter are subjected to various stresses and loads, the arrangement contemplated being such that the piston is spaced nearer to the body or like part when the load is relatively heavy than when the load is less. Moreover, the springs flexibly spacing parts, such as the body 58 and axle 47 apart and with which my improved shock absorber and cushioning device will be associated may be formed in any suitable known manner to coact with the shock absorber and the cushioning device to effect the most satisfactory results, as by distribution of material of which the springs will be constructed along the length of the spring or by varying the form and dimensions of the springs as required.

Obviously, my invention is susceptible of embodiment other than that in which illustrated in the accompanying drawings, and I therefore consider as my own, all modifications and adaptations thereof which fairly fall within the scope of the appended claims. For example, the inlet 60 need not open through the cap 42 but may open through the vertical walls of the cylinder 40 above the level of the ports 45.

I claim:—

1. In a device of the character described, a cylinder provided with an inlet adjacent to the one end thereof, an inwardly opening valve controlling the inlet and adapted to remain open when the pressure within the cylinder is not higher than atmospheric pressure and to close upon increase of pressure within the cylinder, and a piston reciprocable within the cylinder.

2. In a device of the character described a cylinder, means associated with the cylinder and cooperating therewith to provide a by-pass communicating at one end with the interior of the cylinder adjacent to the one end of the latter and communicating at its other end with the interior of the cylinder intermediate of the length of the latter, a piston operating within the cylinder, and means connecting with the cylinder adjacent to the said one end thereof whereby fluids at various pressures may be supplied to the cylinder.

3. In a device of the character described, a cylinder provided with an inlet adjacent to one end thereof, means associated with the cylinder and cooperating therewith to provide a by-pass communicating at one end with the interior of the cylinder adjacent to the said one end of the latter and communicating at its other end with the interior of the cylinder intermediate of the length of the latter, an apertured piston operating within the cylinder, valve means controlling the passage of a fluid within the cylinder through the piston, and an inwardly opening check valve controlling the inlet and adapted to remain open when the fluid within the cylinder is at atmospheric pressure and to close when the fluid within the cylinder is at a pressure greater than atmospheric pressure.

4. In combination, a source of pressure supply having an outlet, a reducing valve for controlling the outlet, a cylinder having an inlet adjacent to one end thereof, an inwardly opening check valve controlling the inlet, a conduit connecting the reducing valve and the inlet, and a piston working within the cylinder.

5. A shock absorber and cushioning device for regulating the action of a vehicle spring comprising a vertically disposed cylinder, said cylinder having an inlet adjacent to its upper end, a piston reciprocable within the cylinder and having a piston rod extending through the upper end of the cylinder and adapted to be connected to a part to be cushioned, means for attaching the cylinder at its lower end to an axle housing, means associated with the cylinder and cooperating therewith to provide a by-pass communicating at one end with the interior of the cylinder adjacent to the upper end of the latter and communicating at its other end with the interior of the cylinder intermediate of the length of the latter, and an inwardly opening check valve controlling the inlet and adapted to remain open when the pressure within the cylinder is not higher than atmospheric pressure and to close upon increase of pressure within the cylinder.

6. A shock absorber and cushioning device for regulating the action of a vehicle spring comprising a vertically disposed cylinder, said cylinder having an inlet adjacent to its upper end, a piston reciprocable within the cylinder and having a piston rod extending through the upper end of the cylinder and adapted to be connected to a part to be cushioned, means for attaching the cylinder at its lower end to an axle housing, means associated with the cylinder and cooperating therewith to provide a by-pass communicating at one end with the interior of the cylinder adjacent to the upper end of the latter and communicating at its other end with the interior of the cylinder intermediate of the length of the latter, an inwardly opening check valve controlling the inlet and adapted to remain open when the pressure within the cylinder is not higher than atmospheric pressure and to close upon increase of pressure within the cylinder, said piston having a vertical opening therethrough, and a flap valve carried by the piston and controlling the opening through the piston.

BENJAMIN KERR.